Dec. 29, 1925.  A. T. HUGAAS  1,567,147
POTATO SEED CUTTER
Filed May 26, 1925   2 Sheets-Sheet 2
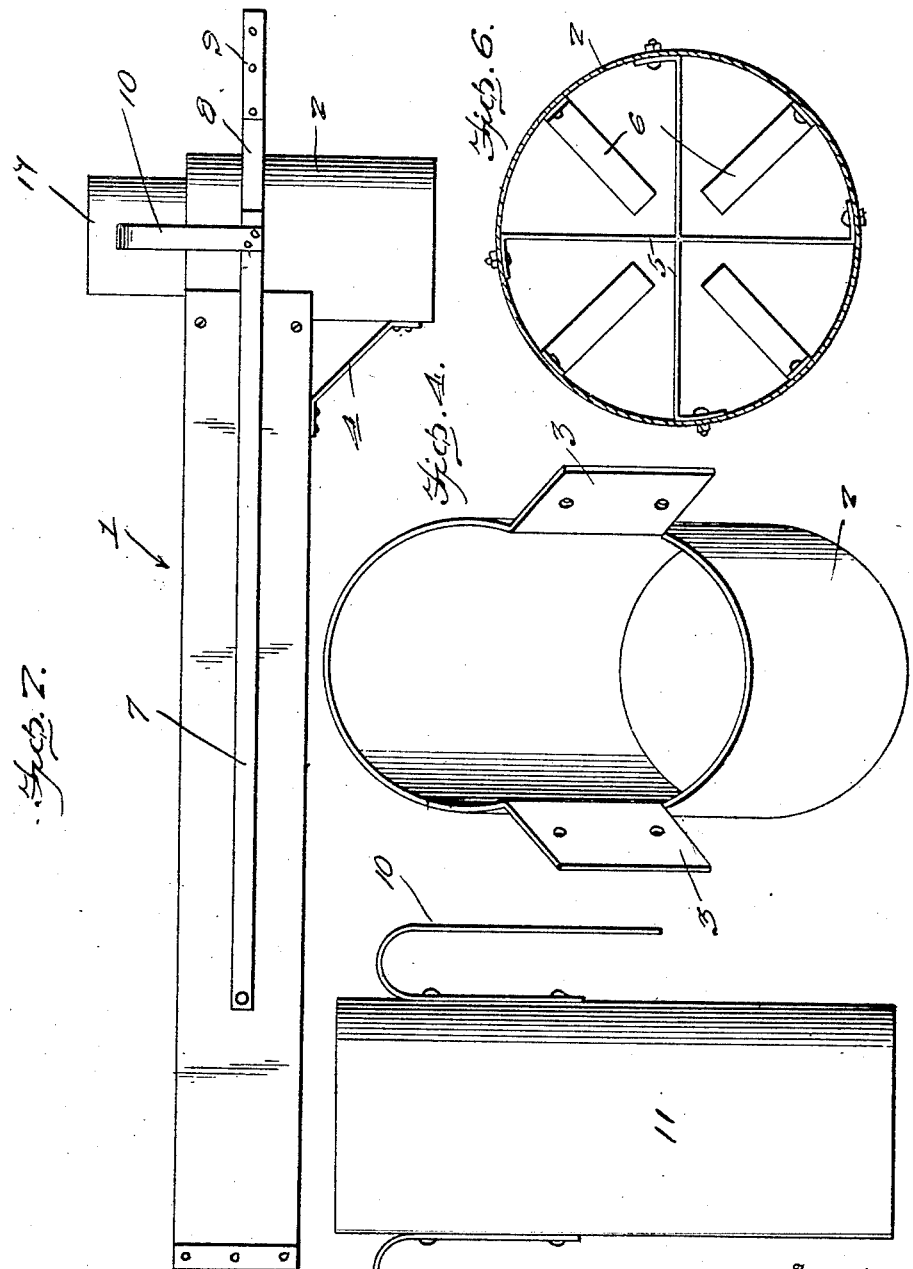

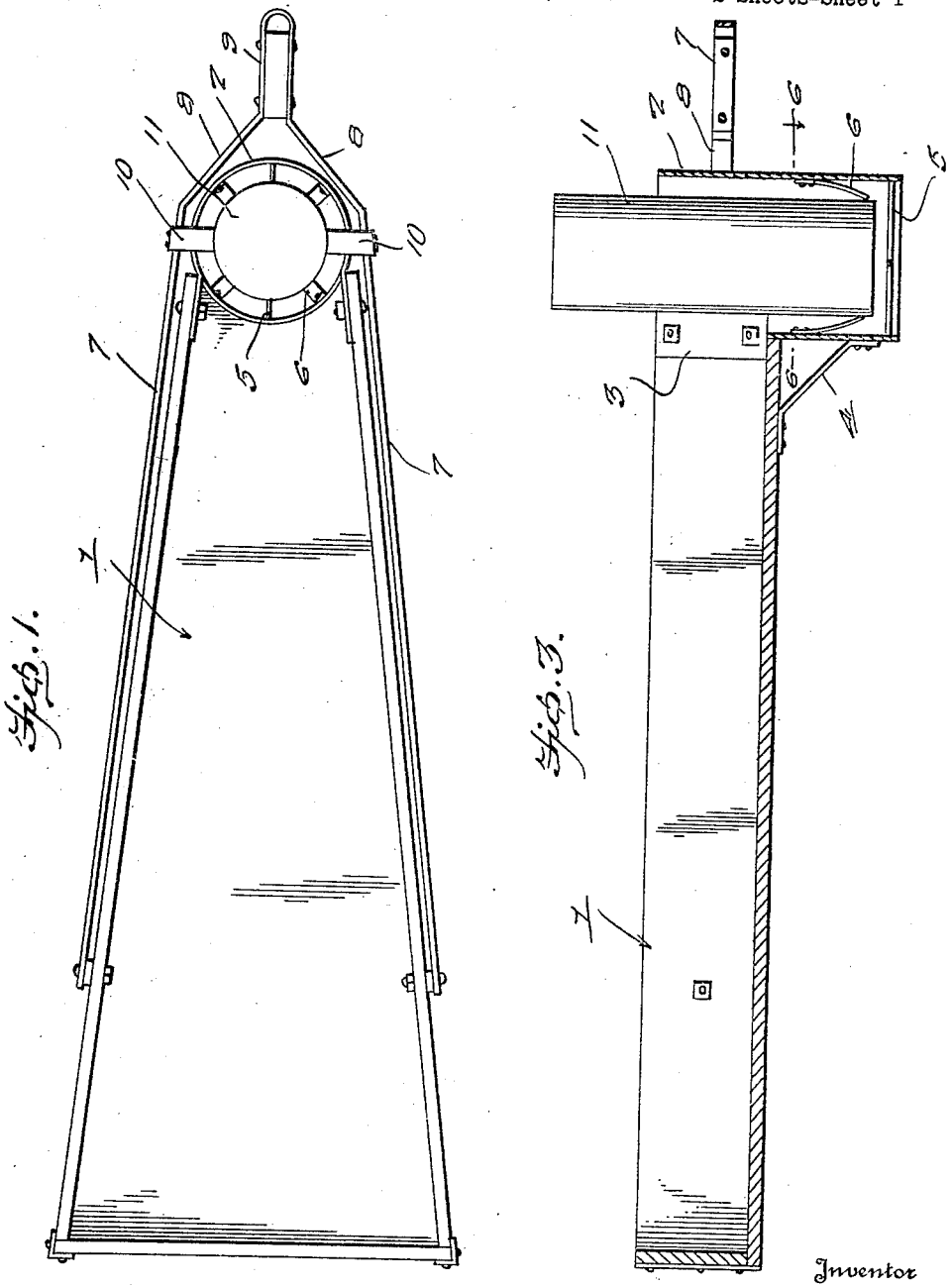

Patented Dec. 29, 1925.

1,567,147

UNITED STATES PATENT OFFICE.

ALBERT T. HUGAAS, OF HETLAND, SOUTH DAKOTA.

POTATO-SEED CUTTER.

Application filed May 26, 1925. Serial No. 33,025.

*To all whom it may concern:*

Be it known that I, ALBERT T. HUGAAS, a citizen of the United States, residing at Hetland, in the county of Kingsbury and State of South Dakota, have invented certain new and useful Improvements in a Potato-Seed Cutter, of which the following is a specification.

This invention relates to an improved apparatus, by means of which one or more potatoes are simultaneously cut into pieces to serve as seed in a subsequent planting operation.

Broadly, the invention comprises an appropriate hopper into which a number of potatoes are dumped, and from which they gravitate into a receptacle in which the cutting blades are located, there being a plunger reciprocable in this receptacle for forcing or jamming the potatoes down against the cutting blades, to be cut into several pieces.

One feature of the invention is the novel hopper which is in the form of an elongated tapered trough for containing a plurality of the potatoes, the same being adapted to be arranged in an inclined position so that the potatoes are practically automatically fed into the cutting receptacle.

Another feature of the invention is the receptacle which is attached to the discharge end of the trough, the same being provided with guiding springs for centering the hand operated reciprocable plunger.

Other features and advantages of the invention will become apparent from the following description taken in connection with the accompanying drawings.

In the accompanying drawings forming a part of this application and in which like numerals designate like parts throughout the same:

Figure 1 is a top plan view of an apparatus constructed in accordance with the present invention.

Figure 2 is a side view of the same.

Figure 3 is a central longitudinal section.

Figure 4 is a detail perspective view of the cutter containing receptacle.

Figure 5 is a detail elevational view of the plunger.

Figure 6 is an enlarged section taken approximately upon the plane of the line 6—6 of Figure 3, the plunger being omitted.

Referring to the drawings in detail, the reference character 1 designates an elongated trough which, as before stated, is preferably comparatively shallow, and is tapered from the intake to the discharge end as plainly represented in Figure 1. Fastened to the discharge end of the trough is a cylindrical open ended receptacle or cylinder 2. The bottom of the trough is preferably formed with a notch to accommodate the lower solid portion of the cylinder, the upper portion of the latter being split, and the metal being bent out to provide attaching flanges 3 disposed in somewhat diverging relation, and detachably fastened to the side walls of the trough by appropriate fasteners. In order to render the structure more rigid a diagonal brace 4 is placed between the bottom of the trough and the corresponding portion of the cylinder. Fitted in the bottom of the cylinder are appropriate intersecting cutters 5 which, as is obvious serve to cut the potatoes into four sections. Fastened to the wall of the cylinder above the cutters are four resilient fingers 6 arranged at circumferentially spaced points.

Pivoted to the side walls of the trough are beams or arms 7 which extend beyond the cylinder, and are bent around it in the diverging relation as shown at 8 in Figure 1. A handle 9 is formed at this point by means of which the arms are raised up and down. Connected by substantially U-shaped members 10 to the last named ends of the arms is a wooden plunger 11.

In practice, the device is placed in a wagon, or upon other appropriate supporting means with the trough preferably in an inclined position. The potatoes are dumped into the trough and gravitate downwardly through the same and drop into the cylinder 2 upon the cutting blades 5. The handle 9 is grasped and moved up and down, and this carries the plunger in a corresponding manner, thus forcing the potatoes down upon the cutters and splitting the potatoes into four sections. The cut sections are used for seeds.

Undoubtedly the description taken in connection with the drawings will enable a clear comprehension of the invention to be obtained, therefore a more lengthy description is thought unnecessary.

Minor changes coming within the field of invention claimed may be resorted to if desired.

Having thus described the invention, what I claim as new and desire to secure by Letters Patent is:—

1. A vegetable cutter of the class described comprising a cylinder provided at its bottom with cutters, the vegetables adapted to be dropped into said cylinder, a hopper by means of which the vegetables are fed into the cylinder, a plunger reciprocable in said cylinder, and means pivotally mounting said plunger upon said hopper to dispose it in fixed relation with respect to the cylinder and cutters.

2. A vegetable cutter of the class described comprising a trough, a cylinder located at one end of the trough to receive the vegetables, cutters in the bottom of said cylinder, a plunger movable in said cylinder, arms pivotally mounted upon the side walls of the trough, a handle connected to said arms, and a plunger connected to said arms and reciprocable in said cylinder.

In testimony whereof I affix my signature.

ALBERT T. HUGAAS.